(12) United States Patent
Peng et al.

(10) Patent No.: US 10,460,643 B2
(45) Date of Patent: Oct. 29, 2019

(54) METHOD, DEVICE AND NON-TRANSITORY COMPUTER-READABLE STORAGE MEDIUM FOR CONTROLLING FRAME RATE OF MOBILE TERMINAL

(71) Applicant: GUANGDONG OPPO MOBILE TELECOMMUNICATIONS CORP., LTD., Dongguan, Guangdong (CN)

(72) Inventors: Deliang Peng, Guangdong (CN); Yongpeng Yi, Guangdong (CN); Shengjun Gou, Guangdong (CN); Xiaori Yuan, Guangdong (CN); Gaoting Gan, Guangdong (CN); Zhiyong Zheng, Guangdong (CN); Hai Yang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/813,287

(22) Filed: Nov. 15, 2017

(65) Prior Publication Data

US 2018/0261143 A1    Sep. 13, 2018

(30) Foreign Application Priority Data

Mar. 10, 2017   (CN) .......................... 2017 1 0142970

(51) Int. Cl.
*G09G 5/00* (2006.01)
*G09G 3/20* (2006.01)
(Continued)

(52) U.S. Cl.
CPC .......... *G09G 3/2018* (2013.01); *G06F 1/3206* (2013.01); *G06F 1/3243* (2013.01); *G06F 1/3265* (2013.01); *G06F 3/1407* (2013.01); *G06F 3/147* (2013.01); *G09G 5/022* (2013.01); *G09G 5/026* (2013.01); *G09G 5/14* (2013.01); *G09G 2330/021* (2013.01); *G09G 2340/0435* (2013.01); *G09G 2340/10* (2013.01); *G09G 2340/12* (2013.01); *H04M 1/72569* (2013.01)

(58) Field of Classification Search
CPC ....... G09G 2340/0435; G09G 2340/10; G09G 2340/12; G09G 5/026; G09G 5/377
See application file for complete search history.

(56) References Cited

U.S. PATENT DOCUMENTS 8,542,221 B1 * 9/2013 Wyatt .................... G06F 15/00
                                                            345/204
2008/0055318 A1   3/2008 Glen
(Continued)

FOREIGN PATENT DOCUMENTS

CN    101589420 A    11/2009
CN    102063695 A     5/2011
(Continued)

OTHER PUBLICATIONS

European Search Report dated Apr. 17, 2018.
(Continued)

*Primary Examiner* — Hau H Nguyen
(74) *Attorney, Agent, or Firm* — Ladas & Parry LLP (57) ABSTRACT

A method, device and non-transitory computer-readable storage medium for controlling a frame rate of a mobile terminal are disclosed. The method includes obtaining a rendering frame rate of a target object in a current running scene, the target object including a target application or a target layer, setting a composition frame rate in the current running scene according to the rendering frame rate of the target object, composing rendered images in the current running scene at the composition frame rate, and displaying a composed image.

15 Claims, 5 Drawing Sheets

(51) Int. Cl.
*G06F 3/147* (2006.01)
*G09G 5/02* (2006.01)
*G09G 5/14* (2006.01)
*G06F 1/3206* (2019.01)
*G06F 1/3234* (2019.01)
*G06F 3/14* (2006.01)
*H04M 1/725* (2006.01)

(56) References Cited

U.S. PATENT DOCUMENTS

2013/0335442 A1 12/2013 Fleck et al.
2016/0286155 A1* 9/2016 Bhuvanagiri .... G11B 20/00007
2017/0092340 A1* 3/2017 Zheng ................. G11C 7/1072

FOREIGN PATENT DOCUMENTS

| CN | 104503564 A | 4/2015 |
| CN | 105094272 A | 11/2015 |
| CN | 105122346 A | 12/2015 |
| CN | 105739670 A | 7/2016 |
| CN | 105741819 A | 7/2016 |
| CN | 105867576 A | 8/2016 |
| CN | 106933328 A | 7/2017 |

OTHER PUBLICATIONS

CN 104503564 A_English Abstract.
International Search Report (ISR) and Written Opinion (WO) dated Jan. 17, 2018 for International Application No. PCT/JP2017/107770.

* cited by examiner

METHOD, DEVICE AND NON-TRANSITORY COMPUTER-READABLE STORAGE MEDIUM FOR CONTROLLING FRAME RATE OF MOBILE TERMINAL

CROSS REFERENCE TO RELATED APPLICATIONS

This application claims priority to Chinese patent application No. 201710142970.9 entitled "METHOD AND DEVICE FOR CONTROLLING FRAME RATE OF MOBILE TERMINAL, AND MOBILE TERMINAL THEREOF", and filed on Mar. 10, 2017, the disclosures for which are hereby incorporated herein in their entireties by reference.

TECHNICAL FIELD

The present disclosure relates generally to the technical field of mobile terminals, and more particularly, to a method, device and non-transitory computer-readable medium for controlling a frame rate of a mobile terminal.

BACKGROUND TECHNOLOGY

With the development of mobile terminal technologies, various mobile terminals have become indispensable tools for people's lives and work. A mobile terminal with an operating system installed ears present various display images at different times by constantly refreshing the images.

In a mobile terminal, such as a mobile phone, the display and refresh processes mainly include operations of image rendering, image composing and image displaying. Each application, such as a desktop program or a video player, performs rendering operations to render their respective images. A composing operation is then performed by the system to combine all the images rendered by each application into a display frame after all the rendering operations are finished. The display frame is output to the display screen for display. The control of the frame rate in the related art, however, has defects and needs to be improved.

SUMMARY

Embodiments of the present disclosure provide a method and a device for controlling a frame rate of a mobile terminal, and the mobile terminal thereof, which can control a composed frame rate of the mobile terminal in a reasonable way.

In a first aspect, a method for controlling frame rate of a mobile terminal is provided. The method includes obtaining a rendering frame rate of a target object in a current running scene, the target object including a target application or a target layer. The method also includes setting a composition frame rate in the current running scene according to the rendering frame rate of the target object. Furthermore, the method includes composing rendered images in the current running scene at the composition, frame rate, and displaying a composed image.

In a second aspect, a device for controlling a frame rate of a mobile terminal is provided. The device includes a rendering frame rate obtaining module configured to obtain a rendering frame rate of a target object in a current running scene, the target object including a target application or a target layer. The device also includes a composition frame rate setting module configured to set a composition frame rate in the current running scene according to the rendering frame rate of the target object. In addition, the device, farther includes a rendered images composing module configured to compose rendered images, in the current running scene at the composition frame rate, and display a composed image.

In a third aspect, a non-transitory computer-readable storage medium for storing computer executable instructions is provided. The computer executable instructions are used to control a processor to execute a method for controlling a frame rate of a mobile terminal. The method includes obtaining a rendering frame rate of a target object in a current running scene, the target object including a target application or a target layer. The method further includes setting a composition frame rate in the current running scene according to the rendering frame rate of the target object. Furthermore, the method includes composing rendered images in the current, running scene at the composition frame rate, and displaying a composed image.

Other features of the technology will be apparent from consideration of the Information contained in the following detailed description.

BRIEF DESCRIPTION OF THE DRAWINGS

For better illustration, a brief description of the accompanying drawings used herein is given below. It is to be understood that the drawings listed below are only examples without construed as limitation to the scope of the disclosure.

DETAILED DESCRIPTION OF THE EMBODIMENTS

The embodiments of the present disclosure will now be described in conjunction with the accompanying drawings, and it will be apparent that the described embodiments are merely part of the embodiments of the disclosure and are not intended to be exhaustive. All other embodiments obtained by those skilled in the art without making creative work are within the scope of the present disclosure, based on the embodiments of the present disclosure. In order to clearly illustrate the objects, technical solutions and advantages, embodiments of the present disclosure will now be described in conjunction With the accompanying drawings.

If is to be understood that the specific embodiments described herein are for the purpose of explaining rather than limiting of the disclosure. It is also to be understood that for the sake of convenience of description, only portions of the contents are shown in the drawings. Before discussing the exemplary embodiments in more detail, it should be noted that some exemplary embodiments are described as processes or methods depicted in the flowcharts. Although the flowcharts describe the operations as sequential processing, many of these operations may be implemented concurrently, or simultaneously. In addition, the order of operations can be rearranged. The processing may be terminated when its operations are completed, but may also have additional operations not included in the drawings. The processing may correspond to methods, functions, procedures, subroutines, subroutines, and the like.

Figure 1:
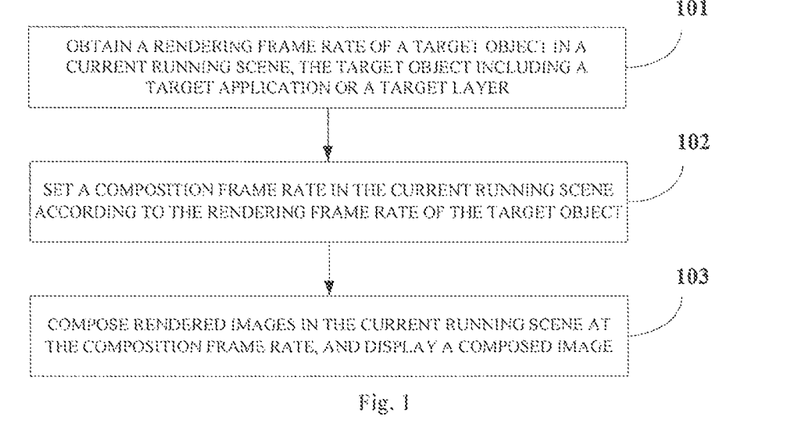
FIG. 1 is a flowchart illustrating a method for controlling a frame rate of a mobile terminal according to an embodiment of the disclosure.

FIG. 1 is a flowchart illustrating a method for controlling a frame rate of a mobile terminal according to an embodiment of the disclosure. The method may be performed by a device for controlling a frame rate of a mobile terminal. The device may be implemented by hardware and/or software, and may be provided internally as part of the mobile terminal.

As shown in FIG. 1, a method for controlling a frame rate of a mobile terminal includes, at 101, obtaining a rendering frame rate of a target object in a current running scene, the target object including a target application or a target layer.

Figure 2:
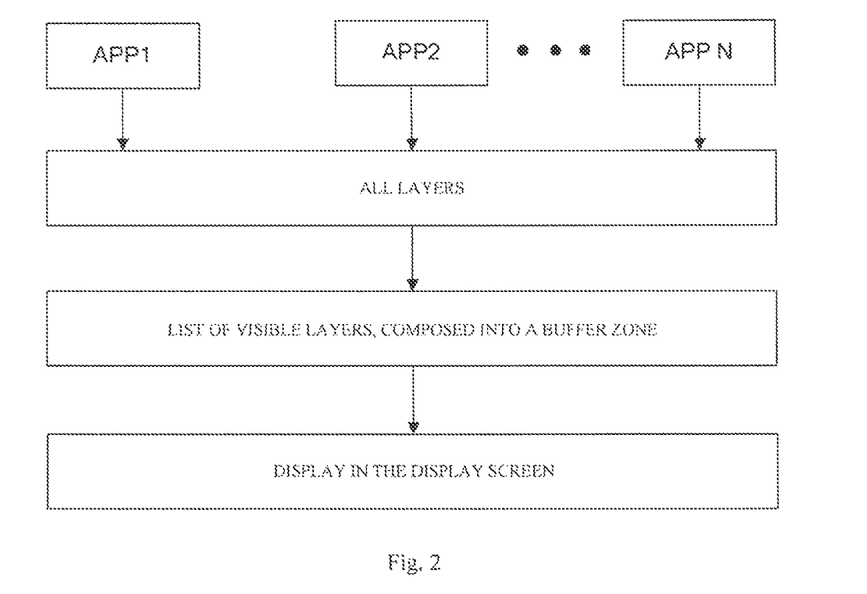
FIG. 2 is a schematic diagram illustrating a display process according to an embodiment of the disclosure.

To facilitate understanding, the Android system will be taken as an example to briefly describe the process of image generation to display. FIG. 2 is a schematic diagram illustrating a display process according to the embodiment.

Firstly, in an application layer, each application (abbreviated as APP) contains one or more layers, and each application APP1, APP2 . . . APPN may perform a rendering operation respectively, i.e., rendering an image in a layer, according to its own application design, the application design generally determined by the corresponding installation package APK. After the image rendering operation, each application may transmit rendered images to a surface flinger which performs image composition. The rendered images by an APP each time the rendering operation is performed may include images of one or more layers.

Then, in the application framework layer, all the layers including visible and invisible layers form a layer list defined as ListAll. The surface flinger picks out visible layers from ListAll to form a list of visible layers, and define it as DisplayList. The surface flinger may then find an idle frame buffer (abbreviated as BF) from the three recyclable BFs in the system, and perform image composition on the free FB to overlay a plurality of layers contained in the DisplayList to obtain an a final frame (i.e., image to be displayed), based on application configuration information, for example, which of these rendered images should be positioned at the bottom, and which should be positioned at the top, etc.

At last, in a Kernel layer, the image to be displayed may be transmitted to a display unit. The display unit may include a display controller and a screen, and the display controller may receive the image to be displayed and display the received image on the screen. The type of the display unit is not limited here, which, for example, may be a liquid crystal display (LCD).

Figure 3:
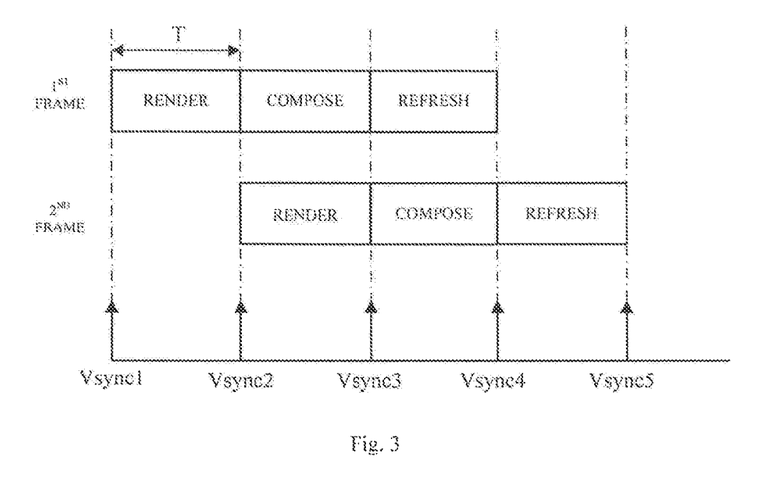
FIG. 3 is a schematic diagram illustrating a Vsync display mechanism according to an embodiment of the disclosure.

In addition, a vertical synchronization (Vsync) refresh mechanism may be introduced in the Android system for display refresh. FIG. 3 shows a Vsync display mechanism used in this embodiment. In particular, the Vsync refresh mechanism is a refresh mechanism in which a "heartbeat" signal i.e., system Vsync signal, may be inserted during the whole display process. The "heartbeat" signal is transmitted by the display controller of the display unit to the processor for generating a Vsync interrupt to control each rendering operation and each composition operation. Both the rendering operation and the composition operation should be performed based on the "heartbeat" signal so that all the critical processes of the display image processing may have been included in a uniform management, mechanism based on the Vsync. A common frequency of the Vsync signal is at 60 Hz.

As shown in FIG. 3, assume that the cycle of the Vsync signal is T and there is no delay in signal transmission. After a first Vsync signal Vsync1 reaches the processor, the processor may transmit the first Vsync signal Vsync1 to a plurality of applications and each of the plurality of applications may perform a rendering operation in response to a touch or drag manipulation on the screen. After each of the plurality of applications has completed the rendering operation, a plurality of layers rendered by the plurality of applications respectively may be obtained. After a second Vsync signal Vsync2 reaches the processor, the processor may transmit the second Vsync signal Vsync2 to the surface flinger. The surface flinger may then perform image composition operation to compose the plurality of layers rendered by the respective applications into an image to be displayed. After a third Vsync signal Vsync3 reaches the processor, the system may perform display refresh, to display the image to be displayed on the display screen.

During the processes of the image rendering, composition and display refresh of the mobile terminal, there may be three types of frame, rates: rendering frame rate, composition name rate and refresh rate.

The rendering frame rate is a frame rate at which the surface flinger is triggered to perform Image composition after the image rendering has been completed, and may be understood as the number of times the image rendering, is performed per unit of time (for example, 1 second). The rendering frame rate may include rendering frame rate of the application program, and rendering frame rate of the layer. There may be a plurality of applications running in the system, and each application may include multiple layers. For example, the video player application may Include at least a video image layer for displaying video content, a user interface layer for displaying user interface controls (pause button, play progress bar and fast forward, button, etc.) or advertisements, and the bullet screen layer for displaying bullet-like comments. The rendering fame rate of the application is the number of times the image rendering operation is performed per unit time. The rendered image obtained by the application each time the rendering operation, is performed may include images of one layer or a plurality of layers. The drawing frame rate of the layer is the number of times the layer is triggered to be rendered per unit time.

The composition frame rate is a frame rate at which the rendered images of each application are composed into an image to be displayed in the ease a plurality of applications are running, or the frame rate at which the images of at least one layer rendered fey one application are composed into an linage to be displayed in the case one application is running. Alternatively, it can be understood as the number of frames of the image to be displayed composed per unit time.

The refresh rate is a frame rate at which the image of the display screen of the mobile terminal is refreshed. The display screen is usually refreshed at a refresh rate of 60 Hz.

In the present embodiment, one or more applications may run In the current running scene. In Example One, two applications, including Sohu browser and Security Guard, are running at the same time in the current scene. The Security Guard is in the form of floating icon in the display of the graphical user interlace. In Example Two, only one video application is running in the horizontal full-screen scene. As in Example One, although two applications are running In the current scene, the user may only be interested in the Sohu browser, so the Sohu browser can be determined as the target application. In Example Two, in the horizontal full-screen scene, the user may only focus on the video image layer, thus the video image layer can be determined as the target layer. That is, the application or the layer that the user is interested in can be determined as the target object.

The method may further include the following. If a plurality of applications are running in the current running scene, an application with an application attribute satisfying a first preset condition is determined as a target application; and if one application is funning in the current running scene, a layer of layers of the application with a layer attribute satisfying a second preset condition is determined as a target layer.

The application attribute may include the type and the priority of the application, and the layer attribute may include the type, the priority and the operation mode of the layer.

The method may further include that determining that an application of video or game type or an application with the highest priority satisfies the first preset condition; or determining that a layer of video image type, a layer with the highest priority or a layer running in a horizontal full-screen mode satisfies the second preset condition.

For example, if a plurality of applications is running in the current operation scene, the applications of video or game type may be determined as the target applications satisfying the first preset condition. In the above Example One, the Sohu browser (application of the browser type) can be determined, as the target application. Alternatively, the Sohu browser which is an application with the highest priority (assuming that the browser is allocated with a higher priority than the safety guard) can be determined as the target application, in the above Example Two, a layer of video image type may be determined as the target layer; a video image layer with the highest priority (assuming that the video image is allocated with a higher priority than the layer of UI and bullet screen) may be determined as the target layer; alternatively, a video image layer running in a horizontal full-screen mode may be determined as the target layer according to the running mode of the layer.

At 102, the method performs setting a composition frame rate in the current running scene according to the rendering frame rate of the target object.

The relationship between the rendering frame rate and the composition frame rate is now described. If there are multiple applications running in the current scene, the range, of the composition frame rate C is within a range of Pmax≤C≤min(Psum, refresh rate), where Pmax is the maximum rendering frame rate for all the applications, and Psum is the sum of the rendering frame rates for all applications. For example, if three applications are running and the display refresh rate is 60, the rendering frame rates for each application can be 20, 30 and 40, respectively. That is because one or two or three applications may perform, rendering operations within the same Vsync signal during image rendering operation of the Vsync signal, and each rendering operation per unit time of different applications may be performed within the same Vsync signal or among different Vsync signals. In this way the value of the composition frame rate C is in a range of [40, 60].

Assume that there is one application in the current running scene, and the application includes multiple layers, then the value of the composition frame rate C is In a range of Tmax≤C≤min(Tsum, the maximum refresh rate), where Tmax is the maximum sundering frame rate of the rendering frame rates for all layers, and Tsum is the sum of the rendering frame rates for all layers.

Specifically, the method may further include setting the composition frame rate in the current running scene to be the same as the rendering frame rate of the target object. As shown in Example Two, the rendering frame rate of the target layer is set to the composite frame rate in the horizontal full-screen video playback scene. For example, in case the rendering frame rate of the video image layer is 40, the rendering frame rate of the UI layer is 30, and the rendering frame rate of the barrage layer is 20, the frame rate can be set to 40. In this way, it is possible to eliminate participation of the rendering images of non-target objects in the composition, while ensuring that the rendering images of the target object can be composed and displayed. Compared to the known composition at a constant composition frame rate (for example, a composition frame rate of 60 Hz, same to the constant refresh rate), the composition frame rate of the mobile terminal can be configured in real time according to the applications m the current running scene, and the power consumption of the mobile terminal can be lowered by reducing the composition workload of the surface flinger.

In addition, it is also possible to control indirectly the composition frame rate by setting a frequency of the Vsync signal supplied from the processor to the surface flinger to be the same as the rendering frame rate of the target object. For example, the frequency of the Vsync signal can be set to 40 Hz.

At 103, the rendered images in the current running scene at the composition frame rate are composed, and a composed image is displayed.

In the case when multiple applications are running in the current scene, the images rendered by the respective application programs may be composed according to the composition frame rate. Alternatively, when there is one application running in the current scene, the images rendered by this application may be composed according to the composition frame rate.

Figure 4:
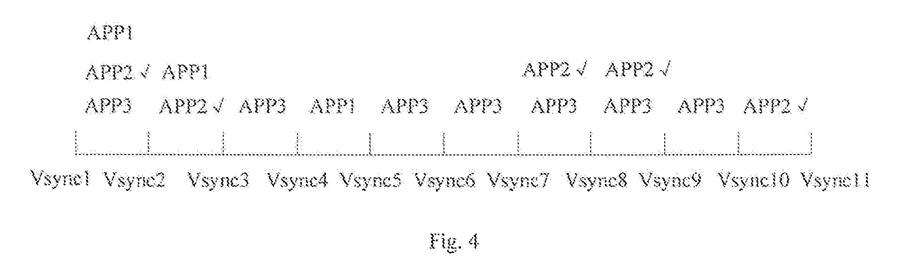
FIG. 4 is a schematic diagram illustrating a composing operation after setting a frame rate of a target object as a composition frame rate according to an embodiment of the disclosure.

FIG. 4 is a schematic diagram illustrating a composing operation alter setting a frame rate of a target object as a composition frame rate according to an embodiment of the disclosure. For convenience of description, the 60 Hz Vsync signal provided by the processor to the surface flinger is simplified to 10 Hz; that is, for example, 10 Vsync signals are provided per second for composition. Assume that three applications, APP1, APP2 and APP3, are running currently, the respective rendering frame rates being 2 Hz, 5 Hz and 7 Hz, and APP2 is the target application. Thus, the composition frame rate can be set to 5 Hz. As shows in FIG. 4, for the 10 Vsync signals, the rendered images to be composed are as follows: rendered, images of APP1, APP2 and APP3 to be composed for the first Vsync signal, rendered Images of APP1 and APP2 to be composed for the second Vsync signal, rendered images of APP3 to be composed for the third Vsync signal, rendered images of APP1 to be composed for the fourth Vsync signal, rendered images of APP3 to be composed for the fifth Vsync signal, rendered images of APP3 to be composed for the sixth Vsync signal, rendered images of APP3 to be composed for the seventh Vsync signal, rendered images of APP3 to be composed for the eighth Vsync signal, rendered images of APP3 to be Composed for the ninth Vsync signal, and rendered images of APP2 to be composed for the 10th Vsync signal. When the contents to be composed detected upon the first, second, seventh, eighth and tenth Vsync signals contain rendering images of the target application APP2, the surface flinger may perform the composition operation respectively upon each of the above Vsync signals and compose the respective image to be displayed. When the contents to be composed detected upon the other Vsync signals do not contain rendering images of the target application APP2, the surface flinger may cancel the composition operation. That is, the surface flinger performs for five times the composition operations for the 10 Vsync signals, eliminating the need for the composition of the other Vsync signals.

The method may further include setting the refresh rate of the display screen in the current scene to be the same as the composition frame rate. In this way, the display screen can be refreshed at the same rate to the composition frame rate, which can lower the power consumption of the mobile terminal compared to the constant refresh rate of 60 Hz.

The method for controlling the frame rate of the mobile terminal according to this embodiment can obtain a rendering frame rate of a target object in a current running scene, the target object including a target application or a target layer, set a composition frame rate in the current running sane according to the rendering frame rate of the target object, compose rendered images in the current running scene at the composition frame rate, and display a composed image. Thus, it is possible to control the composition frame rate of the mobile terminal in a reasonable way and lower the power consumption of the mobile terminal.

Figure 5:
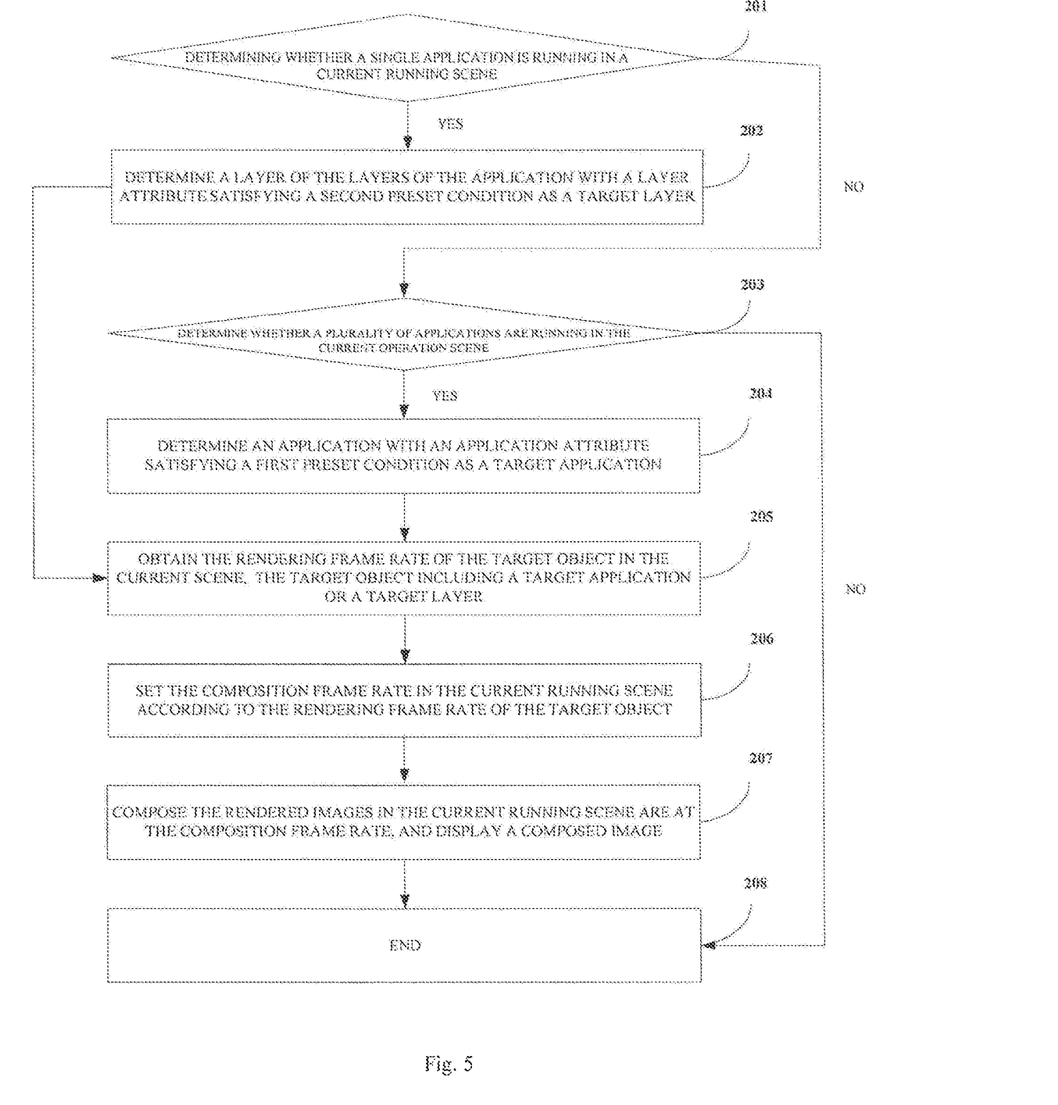
FIG. 5 is a flowchart illustrating a method for controlling a frame rate of a mobile terminal according to an embodiment of the disclosure.

FIG. 5 is a flowchart illustrating a method for controlling a frame rate of a mobile terminal according to an embodiment of the disclosure. As shown in FIG. 5, the method performs, at 201, the determining of whether one application is running in a current running scene, and if it is, perform 202, otherwise perform 203. At 202, a layer of the layers of the application with a layer attribute satisfying a second preset condition is determined as a target layer. The layer attribute may include the type, the priority and the operation mode of the layer. The layer of video image type, the layer with the highest priority, or the layer running in a horizontal full-screen mode may be determined to satisfy the second preset condition. At 203, the method goes to determining of whether a plurality of applications are running in the current operation scene, and if it is, perform 204, otherwise perform 205. At 204, an application with an application attribute satisfying a first preset condition is determined as a target application. The application attribute may include the type and the priority of the application. The application of video or game type or the application with the highest priority may be determined to satisfy the first preset condition. At 205, the rendering frame rate of the target object in the current scene is obtained, the target object including a target application or a target layer. At 206, the composition frame rate in the current running scene is set according to the rendering frame rate of the target object. At 207, the rendered images in the current running scene are composed at the composition frame rate, and a composed image is displayed. Then, the method ends up at 208.

By the method of this embodiment, it is possible to determine the target application or a target layer according to the application attribute or the layer attribute in the current running scene, set a composition frame rate in the current running scene according to the rendering frame rate of the target application or the target layer, compose the rendered images in the current running scene according to the composition frame rate, and display the composed image. In this way, it is possible to control the composition frame rate of the mobile terminal in a reasonable way and lower the power consumption of the mobile terminal.

Figure 6:
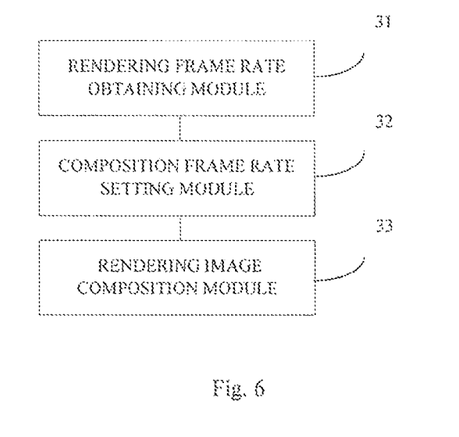
FIG. 6 is a structural schematic diagram illustrating a device for controlling a frame rate of a mobile terminal according to an embodiment of the disclosure.

FIG. 6 is a structural schematic diagram illustrating a device for controlling a frame rate of a mobile terminal according to an embodiment of the disclosure. The device can be implemented by hardware and/or software, and may be integrated in the mobile terminal. As shown in FIG. 6, the device may include a rendering frame rate obtaining module 31, a composition frame rate setting module 32 and a rendering image composition module 33. The tendering frame rate obtaining module 31 is configured to obtain a rendering frame rate of a target object in a current running scene, the target object including a target application or a target layer. The composition frame rate setting module 32 is configured to set a composition frame rate in the current running scene according to the rendering frame rate of the target object. The rendering image composition module 33 is configured to compose rendered images in the current running scene at the composition frame rate, and display a composed image.

On the basis of the above embodiment, the device may further include a target application determining module and a target layer determining module. The target application determining module is configured to determine, when a plurality of applications are running in the current running scene, an application with an application attribute satisfying a first preset condition as a target application. The target layer determining module is configured to determine, when one application is running in the current running scene, a layer of layers of the application with a layer attribute satisfying a second preset condition as a target layer.

On the basis of the above embodiment, the application attribute may include the type and the priority of the application, and the layer attribute may include the type, the priority and the operation mode of the layer.

On the basis of the above embodiment, the device may farther include a first preset condition satisfying determining module and a second preset condition satisfying determining module. The first preset condition satisfying determining module is configured to determine that an application of video or game type or an application with the highest priority satisfies the first preset condition. The second preset condition satisfying determining module is configured to determine that a layer of video image type, a layer with the highest priority, or a layer running in a horizontal full-screen mode satisfies the second preset condition.

On the basis of the above embodiment, the composition frame rate setting module is configured to set the composition frame rate in the current running scene to be the same as the rendering frame rate of the target object.

On the basis of the above embodiment, the device may further include a refresh rate setting module, configured to set a refresh rate of the display screen in the current scene to be the same as the composition frame rate.

By the device of this embodiment, it is possible to obtain a rendering frame rate of a target object in a current running scene, the target object including a target application or a target layer, set a composition frame rate in the current running scene according to the rendering frame rate of the target object, compose rendered images in the current running scene at the composition frame rate, and display a composed image. Thus, it is possible to control the composition frame rate of the mobile terminal in a reasonable way.

Figure 7:
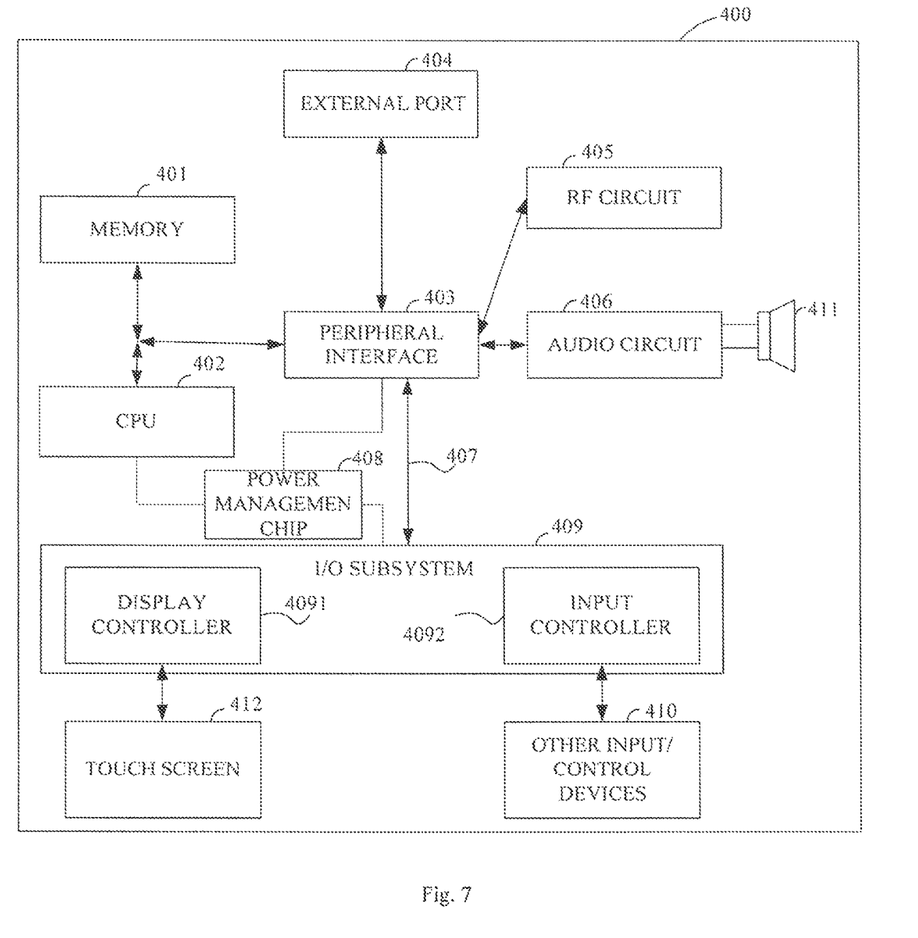
FIG. 7 is a structural schematic diagram illustrating a mobile terminal according to an embodiment of the disclosure.

FIG. 7 is a structural schematic diagram illustrating a mobile terminal according to an embodiment of the disclosure. The mobile terminal can include the control device provided by any of the embodiments of the present disclosure. As shown in FIG. 7, the terminal may include a memory 401 and a Central Processing Unit (hereinafter referred to as CPU) 402. The memory 401 may be configured to store executable programs. The CPU 402 is configured to execute various applications and data processing by running the executable programs stored in the memory 401. In particular, the processor may be caused to execute a method which includes obtaining a rendering frame rate of a target object in a current running scene, the target object including a target application or a target layer; setting a composition frame rate in the current running scene according to the rendering frame rate of the target object; composing rendered images in the current running scene at the composition frame rate, and displaying a composed image.

The mobile terminal may further include a peripheral interface 403, an RF (radio frequency) circuit 405, an audio circuit 406, a speaker 411, a power management chip 408, an input/output (I/O) subsystem 409, a touch screen 412, other input/control device 410, and an external port 704. These components communicate via one or more communication buses or signal lines 407.

It is to be understood that the illustrated mobile terminal 400 is only one example of a mobile terminal, and the mobile terminal 400 may have more or fewer components than shown; two or more components may be combined, or there may be different configurations. The various components shown in the figures may be implemented in hardware, software, or a combination of hardware and software, including one or more signal processing and/or application specific integrated circuits.

The mobile terminal for controlling a frame rate provided by the embodiment will be described in detail and the terminal is exemplified by a mobile phone.

The memory 41 may be accessed by CPU 402, peripheral interface 403, etc., which may include high-speed random access memory and nonvolatile memory, such as one or more disk storage devices, flash memory devices, or other volatile solid state memory devices.

The peripheral interface 403 may connect the input and output peripherals of the device to the CPU 702 and the memory 701.

The I/O subsystem 409 may connect the input and output peripherals of the device, such as the touch screen 412 and other input/control device 410, to the peripheral interface 403. The I/O subsystem 409 may include a display controller 4091 and one or more input controllers 4092 for controlling other input/control device 410. One or more input controllers 4092 may send or receive electrical signals to or from the other input/control device 410. The other input/control devices 410 may include physical buttons (push buttons, rocker buttons, etc.), dial pad, slide switch, joystick, click wheel. It is to be noted that the input controller 4092 may be connected to any of the group including: a keyboard, an infrared port, a USB interface, and a pointing device such as a mouse.

The touch screen 412 is an input and output interlace between the terminal and the user, which can display the visual output to the user. The visual output may include graphics, text, icons, video, etc.

The display controller 4091 in the I/O subsystem 409 may send or receive an electrical signal to or from the touch screen 412. The touch screen 412 may detect the touch on the touch screen, and the display controller 4091 may convert the detected contact into interaction with the user interface object displayed on the touch screen 412, such that the human-computer interaction is realized. The user interface object displayed on the touch screen 412 may be icons of the running games, networking icons to the corresponding network, etc. It is noted that the device may also include a light mouse, which is a touch-sensitive surface that does not exhibit a visual output, or an extension of a touch-sensitive surface formed by a touch screen.

The RF circuit 405 is mainly used for establishing the communication between the mobile phone and the wireless network (i.e., the network side), and realizing the data receiving and sending of the mobile phone and the wireless network, such as sending and receiving short messages, e-mail etc. Specifically, the RF circuit 405 receives and transmits an RF signal, which is also referred to as an electromagnetic signal. Specifically, the RF circuit 405 converts the electrical signal into an electromagnetic signal or converts the electromagnetic signal into an electrical signal, and communicate with the network and other devices with the electromagnetic signal. The RF circuit 405 may include known circuitry for performing these functions, including, but not limited to, an antenna system, an RF transceiver, one or more amplifiers, tuners, one or more oscillators, a digital signal processor, a CODEC (COder-DECoder) chipset, and Subscriber Identity Module (SIM), etc.

The audio circuit 406 is mainly used for receiving audio data front the peripheral interface 403, converting the audio data into an electrical signal and transmitting the electrical signal to a speaker 411.

The speaker 411 is used for restore the voice signal received by the handset from the wireless network through the RF circuit 405 to sound and playing the sound to the user.

A power management chip 408 is sued for powering to and managing the power of the CPU 402, the I/O subsystem and peripheral interface 403 connected to the peripheral interface.

With corresponding functional modules, the above mobile terminal can perform the methods of any one of the embodiments of the present disclosure. In particular, it is possible to obtain a rendering frame rate of a target object in a current running scene, the target object including a target application or a target layer, set a composition frame rate in the current running scene according to the rendering frame rate of the target object, compose rendered images in the current running scene at the composition frame rate, and display a composed image. Thus, it is possible to control the composition frame rate of the mobile terminal in a reasonable way.

Note that the above are only preferred embodiments of the present disclosure and the technical principles used. It will be understood by those skilled in the art that the present disclosure is not limited to the specific embodiments described herein, and that various changes, modifications and substitutions will occur to those skilled in the art without departing from the scope of the present disclosure. Thus, while the present disclosure has been described in more detail by way of the above examples, the present disclosure is not limited to the above embodiments, but may include more and more equivalent embodiments without departing from the spirit of the disclosure. The scope of the disclosure is to be determined by the scope of the appended claims.

The invention claimed is:

1. A method for controlling a frame rate of a mobile terminal, comprising:
    obtaining a rendering frame rate of a target object in a current running scene, the target object including a target application or a target layer and the rendering frame rate being a number of times image rendering is performed per unit of time;

setting the rendering frame rate of the target object as a composition frame rate in the current running scene, the composition frame rate being a number of frames of images to be displayed composed per unit of time; and composing rendered images in the current running scene at the composition frame rate into a composed image, and displaying the composed image;

wherein composing the rendered images in the current running scene at the composition frame rate into the composed image comprises:

when a plurality of applications are running in the current running scene, composing, according to the rendering frame rate of the target application, images rendered by the plurality of applications into the composed image; or when one application is running in the current running scene, composing, according to the rendering frame rate of the target layer, images rendered by the application into the composed image.

2. The method of claim 1, further comprising:

determining, when the plurality of applications are running in the current running scene, an application with an application attribute satisfying a first preset condition as a target application; or determining, when the one application is running in the current running scene, a layer of layers of the application with a layer attribute satisfying a second preset condition as a target layer.

3. The method of claim 2, wherein the application attribute includes a type and a priority of the application, and the layer attribute includes a type, a priority and an operation mode of the layer.

4. The method of claim 3, further comprising:

determining that an application of video or game type or an application with a highest priority satisfies the first preset condition; or determining that a layer of video image type, a layer with a highest priority, or a layer running in a horizontal full-screen mode satisfies the second preset condition.

5. The method of claim 1, further comprising:

setting a refresh rate of the display screen in the current scene to be the same as the composition frame rate.

6. A device for controlling a frame rate of a mobile terminal, comprising:

a rendering frame rate obtaining module, configured to obtain a rendering frame rate of a target object in a current running scene, the target object including a target application or a target layer and the rendering frame rate being a number of times image rendering is performed per unit of time;

a composition frame rate setting module, configured to set the rendering frame rate of the target object as a composition frame rate in the current running scene, the composition frame rate being a number of frames of images to be displayed composed per unit of time;

a rendered images composing module, configured to compose rendered images in the current running scene at the composition frame rate into a composed image, and display the composed image;

wherein the rendered images composing module is configured to:

when a plurality of applications are running in the current running scene, composing, according to the rendering frame rate of the target application, images rendered by the plurality of applications into the composed image; or when one application is running in the current running scene, composing, according to the rendering frame rate of the target layer, images rendered by the application into the composed image.

7. The device of claim 6, further comprising:

a target application determining module, configured to determine, when the plurality of applications are running in the current running scene, an application with an application attribute satisfying a first preset condition as a target application; or a target layer determining module, configured to determine, when the one application is running in the current running scene, a layer of layers of the application with a layer attribute satisfying a second preset condition as a target layer.

8. The device of claim 7, wherein the application attribute includes a type and a priority of the application, and the layer attribute includes a type, a priority and an operation mode of the layer.

9. The device of claim 8, further comprising:

a first preset condition satisfying determining module, configured to determine that an application of video or game type or an application with a highest priority satisfies the first preset condition; or a second preset condition satisfying determining module, configured to determine that a layer of video image type, a layer with a highest priority, or a layer running in a horizontal full-screen mode satisfies the second preset condition.

10. The device of claim 6, further comprising:

a refresh rate setting module, configured to set a refresh rate of a display screen in the current scene to be the same as the composition frame rate.

11. A non-transitory computer-readable storage medium for storing computer executable instructions, the computer executable instructions being used to control a processor to execute a method for controlling a frame rate of a mobile terminal, the method comprising:

obtaining a rendering frame rate of a target object in a current running scene, the target object including a target application or a target layer and the rendering frame rate being a number of times image rendering is performed per unit of time;

setting the rendering frame rate of the target object as a composition frame rate in the current running scene, the composition frame rate being a number of frames of images to be displayed composed per unit of time; and composing rendered images in the current running scene at the composition frame rate into a composed image, and displaying the composed image;

wherein composing the rendered images in the current running scene at the composition frame rate into the composed image comprises:

when a plurality of applications are running in the current running scene, composing, according to the rendering frame rate of the target application, images rendered by the plurality of applications into the composed image; or when the one application is running in the current running scene, composing, according to the rendering frame rate of the target layer, images rendered by the application into the composed image.

12. The non-transitory computer-readable storage medium of claim 11, wherein the method further comprises:

determining, when the plurality of applications are running in the current running scene, an application with an application attribute satisfying a first preset condition as a target application; or determining, when the one application is running in the current running scene, a layer of layers of the application with a layer attribute satisfying a second preset condition as a target layer.

13. The non-transitory computer-readable storage medium of claim 12, wherein the application attribute includes a type and a priority of the application, and the layer attribute includes a type, a priority and an operation mode of the layer.

14. The non-transitory computer-readable storage medium of claim 13, wherein the method further comprises:

determining that an application of video or game type or an application with a highest priority satisfies the first preset condition; or determining that a layer of video image type, a layer with a highest priority, or a layer running in a horizontal full-screen mode satisfies the second preset condition.

15. The non-transitory computer-readable storage medium of claim 11, wherein the method further comprises:

setting a refresh rate of the display screen in the current scene to be the same as the composition frame rate.

* * * * *